US006365130B1

United States Patent
Barry et al.

(12) United States Patent
(10) Patent No.: US 6,365,130 B1
(45) Date of Patent: Apr. 2, 2002

(54) ANTIMICROBIAL CHEWING GUM

(75) Inventors: John E. Barry, Derry, NH (US); Jeffrey A. Trogolo, Boston, MA (US)

(73) Assignee: AgION Technologies L.L.C., Wakefield, MA (US)

( * ) Notice: Subject to any disclaimer, the term of this patent is extended or adjusted under 35 U.S.C. 154(b) by 0 days.

(21) Appl. No.: 09/197,811

(22) Filed: Nov. 23, 1998

(51) Int. Cl.⁷ .......................... A61K 9/68; A61K 33/38; A61K 33/32; A61K 33/24; A01N 25/00
(52) U.S. Cl. .......................... 424/48; 424/405; 424/618; 424/641; 424/649
(58) Field of Search .......................... 424/405, 48, 618, 424/641, 649

(56) References Cited

U.S. PATENT DOCUMENTS

| | | | |
|---|---|---|---|
| 4,022,880 A | 5/1977 | Vinson et al. | 424/49 |
| 4,187,287 A | 2/1980 | Schreiber et al. | 424/49 |
| 4,559,223 A | 12/1985 | Fox, Jr. | 424/48 |
| 4,622,220 A | 11/1986 | Frosch | 424/49 |
| 4,627,974 A | 12/1986 | Lynch | 424/48 |
| 4,795,628 A | 1/1989 | Afseth | 424/54 |
| 4,818,518 A | 4/1989 | Gioffre et al. | 424/44 |
| 4,908,211 A | 3/1990 | Paz | 424/440 |
| 4,911,898 A * | 3/1990 | Hagiwara et al. | 423/118 |
| 5,037,637 A | 8/1991 | Gaffar et al. | 424/52 |
| 5,043,154 A | 8/1991 | Gaffar et al. | 424/52 |
| 5,080,887 A | 1/1992 | Gaffar et al. | 424/52 |
| 5,624,906 A * | 4/1997 | Vermeer | 514/23 |
| 5,629,035 A | 5/1997 | Miskewitz | 426/5 |
| 5,686,064 A | 11/1997 | Gaffar et al. | 424/57 |
| 5,688,492 A * | 11/1997 | Galley et al. | 424/49 |
| 6,123,925 A | 9/2000 | Barry et al. | 424/49 |

FOREIGN PATENT DOCUMENTS

| | | | |
|---|---|---|---|
| EP | 0 321 180 | 6/1989 | A61K/7/18 |
| EP | 0 976 399 | 2/2000 | A61K/35/64 |
| WO | WO 93/24103 | 12/1993 | A61K/9/16 |

OTHER PUBLICATIONS

Yamada et al., *Chemical Abstracts*, vol. 111, #63298, 1989.*
JPO Abstract, Pub No. 403002113, Ogawara, 1991.*

* cited by examiner

Primary Examiner—Russell Travers
Assistant Examiner—S. Wang
(74) Attorney, Agent, or Firm—Edward K. Welch II

(57) ABSTRACT

The present invention provides a novel chewing gum product generally for the lysis and killing of oral microbes. In a preferred embodiment, the chewing gum product comprises an antimicrobial metal ion component and an inorganic ceramic carrier, and provides a concentration of such substances from about 0.05 to 50 weight percent of the chewing gum. In particular, these compositions may comprise zeolites ion-exchanged with antimicrobial metals, in addition to other oral care compounds. The present invention also relates to methods of using such compositions for treating and inhibiting dental caries, dental plaque and gingivitis, oral malodor and periodontal conditions. The compositions of the present invention may be incorporated into chewing gum according to conventional methods used in the art.

21 Claims, No Drawings

ANTIMICROBIAL CHEWING GUM

FIELD OF THE INVENTION

The present invention relates to chewing gum products containing an antimicrobial agent for killing microbes, particularly oral bacteria, for reducing or preventing dental plaque and caries and gingivitis, and to methods for treating the same, and the like.

BACKGROUND OF THE INVENTION

There is a need in the dental arts for an improved means of promoting dental health and hygiene, including a means for reducing plaque and dental caries, gingivitis, and especially for killing microbes which cause these dental problems, as a result of improper and inadequate tooth brushing. Plaque may be removed to some extent by effective brushing of the teeth. However, some areas of the teeth, which are less accessible and cannot be easily reached by a toothbrush, are particularly susceptible to plaque formation and consequently to calculus. Left unhindered, the plaque increases in size and more tenaciously adheres to the teeth. Although brushing with a toothbrush and dentifrice is a widely recognized technique for maintaining dental health, the average person brushes only once a day for approximately one minute. Therefore, a great need exists for finding additional methods for improving daily oral hygiene.

Dental caries, which cause the progressive decay of teeth, are manifested by localized demineralization, caused by acids produced from bacteria that ferment carbohydrate foods. The process may begin when bacteria in the mouth adhere to a tooth surface, thereby forming a dental plaque. The plaque is a product of microbial growth, primarily derived from food residues in the mouth. Mucoproteins and minerals present in saliva and dead cells in the mouth also contribute to plaque formation. There is substantial evidence that dental plaque is the predominant etiological factor responsible for both dental caries and periodontal disease, due to the generation of acids within the plaque structure. Thus, dental compositions having antimicrobial properties are beneficial for killing oral bacteria that contribute to the formation of dental plaque.

A thin layer of dental enamel consisting mainly of calcium, phosphate, and other ions in a hydroxyapatite-like structure forms a protective coating over the tooth. When bacteria in a dental plaque metabolize the fermentable carbohydrates consumed by an individual the process of tooth decay, i.e., dental caries, begins. During this process, lactic acid and other organic acids, toxins and enzymes are secreted as by-products, having a deleterious effect on neighboring oral tissues. These secretions reduce the pH surrounding the tooth, causing the protective coating to dissolve when the pH drops below a critical level (approximately pH 5.5 to 5.7). Dental enamel comprising 2–5% carbonate is particularly susceptible to acid dissolution. Generally, dissolution of the enamel begins below the tooth's porous surface. With repeated acid attacks, caused by further bacterial metabolism of fermentable carbohydrates, sub-surface lesions expand. If the lesions expand to the point that the enamel surface breaks, a cavity is formed and the process is no longer reversible.

Remineralization of a tooth requires the pH near the tooth to remain above the critical level. The remineralization process involves, in part, the flow of saliva over the tooth, which raises the pH of the tooth's environment. Also, calcium and phosphate ions in the saliva precipitate to replace hydroxyapatite that has been dissolved by the organic acids secreted by bacteria. Therefore, an oral antimicrobial composition that increases the amount of saliva in the mouth for extended periods after eating would be beneficial for the remineralization process.

Chewing gum is an excellent adjunct for cleaning teeth since people generally chew gum for much longer periods of time than for brushing. It is especially advantageous when brushing is inconvenient or not possible. Chewing gums provide an excellent delivery system for an antimicrobial composition because of the prolonged contact with the oral cavity during use, and due to the fact that a gum base can provide for the sustained release of the active components. Furthermore, mastication causes the release of saliva into the mouth, and assists in increasing pH levels, which become lowered as a result of bacterial metabolism of fermentable carbohydrates. Consequently, the increase in pH reduces the likelihood that dental caries will form, and therefore certain chewing gums promote dental health and hygeine. However, a chewing gum product that also has antimicrobial properties greatly increases the gum's effectiveness as an agent for reducing plaque formation and dental caries because it acts to kill and reduce oral microbes that are at the root of many dental health and hygiene problems. Moreover, a chewing gum having inorganic antibiotic ingredients which are non-toxic and do not induce resistance in bacteria would be highly advantageous.

Organic antimicrobial agents in oral compositions found in chewing gum, that exhibit microbial-, plaque- and calculus-inhibiting properties are known in the art. For example, U.S. Pat. No. 4,022,880 issued to Vinson et al. describes compounds providing zinc ions admixed with an organic antibacterial agent effective for retarding the growth of plaque bacteria. U.S. Pat. Nos. 5,037,637, 5,043,154, 5,080,887, 5,292,526, and 5,686,064 issued to Gaffar et al. describe the use of Triclosan and an antibacterial-enhancing agent which optimizes or enhances delivery and retention of the antibacterial agent on oral surfaces. U.S. Pat. No. 5,028,414 issued to Sampathkumar et al. describes use of substituted or unsubstituted 1,12-dodecanedioic peroxy acids as antimicrobial agents in chewing gums. U.S. Pat. No. 4,559,223 issued to Fox et al. discloses a method of inhibiting microbial mouth infections and dental caries, plaque formation, gingival destruction and tooth loss by contacting teeth with a composition comprising silver and/or zinc sulfadiazine.

Unfortunately, however, bacteria may become resistant to organic antimicrobial agents. There is therefore a need for an antibiotic chewing gum formulation that avoids use of organic compounds that can induce development of resistant bacterial strains. Thus, an inorganic antimicrobial composition in chewing gum would prove beneficial. There is also a need for a chewing gum formulation that leaves an effective antibiotic residue that continues to kill plaque-forming bacteria for a substantial period after using the chewing gum.

SUMMARY OF THE INVENTION

The present invention relates to chewing gum products containing microbicidally effective amounts of a composition comprising an inorganic ceramic carrier retaining antimicrobial metal ions. In a preferred embodiment, the inorganic ceramic carrier is a zeolite which retains antimicrobial silver ions.

Thus, the present invention provides novel chewing gum products having antimicrobial properties which overcome many problems in the dental health and hygiene arts. The chewing gum products of the invention are effective in killing and reducing oral bacteria and microbes and, consequently, in protecting against dental plaque and caries formation, gingivitis, and the like. Methods for treating the same are also disclosed.

Accordingly, this invention provides novel chewing gum products having antimicrobial properties derived from an inorganic antimicrobial agent, and that serve as a convenient adjunct for improved dental health. The antimicrobial properties of the invention are derived from antimicrobial metal ions that are ion-exchanged with an inorganic ceramic carrier. As an antimicrobial agent, the metal component in the chewing gum is released into the mouth during mastication where it can contact oral microbes involved in plaque and dental caries formation. As the chewing gum contacts the oral cavity and surfaces of the teeth, antimicrobial metal ions retained in the gum can kill microbes thereon. The killing of oral microbes consequently reduces or prevents plaque or dental caries formation.

Thus, the invention provides an antimicrobial chewing gum product that is effective in killing oral microbes, including bacteria, and consequently reduces or prevents the formation of plaque and dental caries, and associated periodontal disease.

It is an advantage of this invention that an antimicrobial oral composition for use in chewing gum is provided which is also effective for reducing the occurrence of gingivitis.

It is also an advantage of the invention that the antimicrobial metal ions employed are effective in combination with known antiplaque and anticalculus oral compositions.

It is a further advantage of the invention that the antimicrobial agent is inorganic, well-tolerated in humans, and does not induce resistance in bacteria.

It is still another advantage of the invention that the antimicrobial particles remain in gum spaces, providing long-lasting action. Moreover, particles retained on the teeth and gums following chewing can continue to release the antimicrobial metal component over an extended period.

Other properties and advantages of the present invention will become apparent from a consideration of the description of the invention.

DETAILED DESCRIPTION OF THE INVENTION

All patents, patent publications, and literature references cited in this specification are hereby incorporated by reference in their entirety.

The chewing gum products of the present invention provide novel antimicrobial properties that may be combined with known characteristics of dentifrices to provide a more convenient adjunct to other oral hygiene vehicles, such as toothpastes and mouthwashes.

According to the present invention, an inorganic antimicrobial metal containing composition is incorporated in a chewing gum product to provide quick, non-toxic antimicrobial action without irritation or the possibility of development of antibiotic resistance associated with organic compounds of the prior art.

A number of metal ions have been shown to possess antibiotic activity, including silver, copper, zinc, mercury, tin, lead, bismuth, cadmium, chromium and thallium. These antibiotic metal ions are believed to exert their effects by disrupting respiration and electron transport systems upon absorption into bacterial or fungal cells. In particular, antimicrobial metal ions of silver, gold, copper and zinc are considered safe for in vivo use. Antimicrobial silver ions are particularly useful for in vivo use due to the fact that they are not substantially absorbed into the body. The use of silver containing compositions in particular allows for an exceptionally safe, non-toxic chewing gum formulation. Thus, the invention provides a means for killing and reducing microbes residing in the mouth, as well as inhibiting growth thereof. More preferably, the invention provides a means for killing or preventing the growth of oral bacteria. Such bacteria may include, but are not necessarily limited to, S. mutans, P. gingavalis, S. aureus, and other oral bacteria.

As used herein, antimicrobial, antibacterial, microbicidal, bactericidal, antibiotic, microbicidally, bactericidally, and the like, shall include an amount of compound at least equal to the minimum inhibitory concentration (MIC), discussed infra., for a particular microbe, and may be used interchangeably.

As used herein, the term "active", when used to describe an ingredient of a chewing gum of the present invention, shall be limited to the antimicrobial compounds of the invention.

As used herein, the term "effective amount" is used synonymously with "sufficient amount", both terms referring to the amount of active ingredient in a chewing gum product of the invention required to achieve the antimicrobial properties thereof.

As used herein, the terms "about" or "approximately" shall mean within 20 percent, preferably within 10 percent, and more preferably within 5 percent of a given value or range.

In a preferred embodiment, antimicrobial ceramic particles are formulated in a chewing gum of the invention to provide antimicrobial activity. The chewing gum formulation provides antimicrobial action that is at least as long lasting as presently used agents, such as Triclosan, but avoids use of an organic antibiotic. Development of resistant bacterial strains is thus avoided. Furthermore, it has been determined that such a chewing gum formulation is able to adequately kill microorganisms over a prolonged period of time.

The chewing gum products of the invention advantageously incorporate a microbicidally effective amount of one or more antimicrobial metals and a suitable inorganic ceramic carrier. A suitable ceramic carrier shall include any inorganic ceramic particle that is combined with an antimicrobial metal of the invention to provide the antimicrobial properties described herein.

In one embodiment of the invention, the inorganic antimicrobial metal containing composition is an antibiotic metal salt. Such salts include silver iodate, silver iodide, silver nitrate, and silver oxide. Silver nitrate is preferred. These salts are particularly quick acting, as no release from ceramic particles is necessary for the chewing gum to function antimicrobially.

The ceramics employed in the antibiotic ceramic particles of the preferred embodiment of the present invention include zeolites, hydroxyapatite, zirconium phosphates or other ion-exchange ceramics. Zeolites are preferred, and are described in the preferred embodiments referred to below. Hydroxyapatite particles containing antimicrobial metals are described, e.g., in U.S. Pat. No. 5,009,898 issued to Sakuma et al. Zirconium phosphates containing antimicrobial metals are described, e.g., in U.S. Pat. Nos. 5,296,238, 5,441,717, and 5,405,644.

Antimicrobial zeolite is the most preferred inorganic antimicrobial metal containing composition for use in the chewing gum products of the invention, and can be prepared according to conventional methods known in the art. Zeolite particles preferably have a particle diameter size of from about 0.2 to 40 μm, more preferably from about 0.5 to 5 μm. They include zeolites disclosed, for example, in U.S. Pat Nos. 4,938,955 issued to Niira et al. and 4,911,898 issued to Hagiwara et al.

Natural zeolites and synthetic zeolites can be used to make the antimicrobial zeolites of the present invention. "Zeolite" is an aluminosilicate having a three dimensional skeletal structure that is represented by the formula: $XM_{2/n}O—Al_2O_3—YSiO_2—ZH_2O$. M represents an ion-exchangeable ion, generally a monovalent or divalent metal ion, n represents the atomic valency of the (metal) ion, X and Y represent coefficients of metal oxide and silica respectively, and Z represents the number of water of crystallization. Examples of such zeolites include A-type zeolites, X-type zeolites, Y-type zeolites, T-type zeolites, high-silica zeolites, sodalite, mordenite, analcite, clinoptilolite, chabazite and erionite. The present invention is not restricted to use of any specific zeolites.

The ion-exchange capacities of these zeolites are as follows: A-type zeolite=7 meq/g; X-type zeolite=6.4 meq/g; Y-type zeolite=5 meq/g; T-type zeolite=3.4 meq/g; sodalite= 11.5 meq/g; mordenite=2.6 meq/g; analcite=5 meq/g; clinoptilolite=2.6 meq/g; chabazite=5 meq/g; and erionite= 3.8 meq/g. These ion-exchange capacities are sufficient for the zeolites to undergo ion-exchange with ammonium and antimicrobial metal ions.

The specific surface area of preferred zeolite particles is at least about 150 $m^2/g$ (anhydrous zeolite as standard) and the $SiO_2/Al_2O_3$ mol ratio in the zeolite composition is preferably less than 14, more preferably less than 11.

The antimicrobial metal ions used in the zeolites of the invention should be retained on the zeolite particles through an ion-exchange reaction. Antimicrobial metal ions which are merely adsorbed or attached without an ion-exchange reaction exhibit a decreased bactericidal effect and their antimicrobial properties are not as long-lasting as is desired. Nevertheless, it is advantageous for imparting quick antimicrobial action to maintain a sufficient amount of surface adsorbed metal ion.

During the ion-exchange process, if the concentration of metal ions in the vicinity of the zeolite surface is high, there is a tendency for the antimicrobial metal ions (cations) to be converted into their oxides, hydroxides, basic salts, etc., which deposit in the micro pores or on the surfaces of the zeolite. This deposition may adversely affect the bactericidal properties of the ion-exchanged zeolite In an embodiment of antimicrobial zeolites, a relatively low degree of ion exchange is employed to obtain superior bactericidal properties. It is believed to be required that at least a portion of the zeolite particles retain metal ions having antimicrobial properties at ion-exchangeable sites of the zeolite in an amount less than the ion-exchange saturation capacity of the zeolite. In a preferred embodiment, the zeolite employed in the present invention retains antimicrobial metal ions in an amount up to 41% of the theoretical ion-exchange capacity of the zeolite. Such ion-exchanged zeolite with a relatively low degree of ion-exchange may be prepared by performing ion-exchange using a metal ion solution having a low concentration as compared with solutions conventionally used for ion exchange.

In antimicrobial zeolite particles used in the present invention, ion-exchangeable ions present in zeolite, such as sodium ions, calcium ions, potassium ions and iron ions are partially replaced with ammonium and antimicrobial metal ions. Such ions may co-exist in the antimicrobial zeolite particle since they do not hinder the bactericidal effect. While antimicrobial metal ions include ions of silver, copper, zinc, mercury, tin, lead, bismuth, cadmium, chromium and thallium, ions to be formulated into compositions to be used in a chewing gum of the invention include silver, gold, copper, and zinc ions. These antimicrobial metal ions can be used alone or in a mixture.

The antimicrobial particles are preferably present in a concentration by weight in the chewing gum formulation of from about 0.05 to 50%, more preferably from about 0.1 to 25%, and most preferably from about 0.1 to 10%.

The antimicrobial metal ion is preferably present in the range of from about 0.1 to 15 wt. % of the zeolite, although larger amounts may be present without compromising the antimicrobial properties of the chewing gum product. In one embodiment, the zeolite can contain from about 0.1 to 15 wt. % of silver ions and from about 0.1 to 8 wt. % of copper or zinc ions. Although ammonium ion can be contained in the zeolite at a concentration of about 20% or less of the zeolite, it is desirable to limit the content of ammonium ions to from about 0.5 to 15%, preferably to from about 1.5 to 5%. Weight % described herein is determined for materials dried at 110° C.

A preferred antimicrobial zeolite for use in a chewing gum formulation is Type A zeolite containing either a combination of ion-exchanged silver, zinc, and ammonium or silver and ammonium. One such zeolite is manufactured by Shinagawa, Inc. under the product number AW-10N and consists of 0.6% by weight of silver ion-exchanged in Type A zeolite particles having a diameter of about 2.5 μ. Another formulation, AJ-10N, consists of about 2% by weight silver ion-exchanged in Type A zeolite particles having a diameter of about 2.5 μ. Another formulation, AW-80, contains 0.6% by weight of silver ion-exchanged in Type A zeolite particles having a diameter of about 1.0 μ. Another formulation, AJ-80N, consists of about 2% by weight silver ion-exchanged in Type A zeolite particles having a diameter of about 1.0 μ. These zeolites preferably contain from about 0.5% to 2.5% by weight of ion-exchanged exchanged ammonium. The zeolites are often obtained in master batches of low density polyethylene, polypropylene, or polystyrene, containing 20 wt. % of the zeolite.

The antimicrobial properties of antimicrobial zeolite particles of the invention may be assayed using conventional assay techniques, including for example determining the minimum growth inhibitory concentration (MIC) with respect to a variety of bacteria, eumycetes, yeast, and other microbes. The MIC of antimicrobial agent is used to evaluate the efficacy of the agent in vitro. In such a test, the microorganisms listed below, for example, may be employed: *Streptococcus mutans, porphyromonas gingivalis, Bacillus cereus var mycoides, Escherichia coli, Pseudomonas aeruginosa, Staphylococcus aureus, Streptococcus faecalis, Aspergillus niger, Aureobasiduim pullulans, Chaetomium globosum, Gliocladium virens, Penicillum funiculosum, Candida albicans*, and *Saccharomyces cerevisiae.*

The assay for determining MIC is known, and can be carried out by smearing a solution containing a particular microorganism for inoculation onto a plate culture medium to which a test sample of antimicrobial composition of the invention is added in a particular concentration, followed by incubation and culturing of the plate. The MIC is defined as the minimum concentration in micrograms/ml of antimicrobial agent required for inhibiting the growth of each type of microorganism. The smaller the MIC value, the greater the efficacy of the antimicrobial agent. The in vitro MIC data is related to the efficacy of the chewing gum employed in vivo since retention and release of the antimicrobial agent into the oral cavity after administration is in the range of $\mu$g/ml.

A chewing gum product of the present invention that comprises antimicrobial metals in an inorganic ceramic carrier may include any variety of different chewing gum types such as, for example, low and high moisture, sugar or sugarless, wax-containing or wax-free, low calorie, and the like. It may further comprise additional ingredients that are conventionally used in the preparation of chewing gums, some of which are disclosed herein. Still, additional ingredients useful in the promotion of dental health and hygiene may be incorporated, including plaque- and calculus-inhibiting, dental cleaning, whitening, or odor reducing agents, and the like, also disclosed herein, without departing from the spirit of the invention.

Certain chewing gum ingredients benefit from or require encapsulation in order to achieve a gradual and controlled release of the particular ingredient during mastication or to promote their stability in a chewing gum product. One advantage of the present invention over other chewing gums is that encapsulation of the active ingredients, i.e., the antimicrobial metal and inorganic ceramic carrier, is not required. A chewing gum product of the invention, instead, releases the antimicrobial metal component into the mouth over an extended period of time.

A chewing gum of the invention has the capability of effecting substantial anti-microbial action even during short periods of chewing. Ion release rate experiments show that the initial release rate of antibiotic zeolites in a typical concentration in chewing gum, e.g., of about 1%, can reach 2500 parts per million (ppm) per minute. At this rate, the minimum inhibitory concentration (MIC) for oral bacteria of about 0.5 to 20 ppm is reached in seconds. Furthermore, it has been determined that ion release begins substantially at the time the chewing gum formulation is prepared. Therefore, at the time the chewing gum is applied to oral surfaces, significant amounts of antibiotic metal ion are available in the formulation to effect antimicrobial action, i.e., the concentration of antimicrobial metal ion is at or above the MIC.

A chewing gum of the invention may have incorporated into it other oral compositions, such as those disclosed in U.S. Pat. No. 5,037,637 issued to Gaffar et al. and U.S. Pat. No. 5,629,035 issued to Miskewitz, without departing from the spirit of the invention. Thus, the chewing gum product may additionally include dentally acceptable polishing materials, whitening agents, preservatives, silicones, chlorophyll compounds and/or ammoniated material such as urea, diammonium phosphate, and mixtures thereof, and the like. These adjuvants can be incorporated into a chewing gum product in amounts which do not adversely affect properties and/or characteristics desired from the present invention.

A chewing gum product of the present invention may be produced in accordance with conventional manufacturing processes known in the art, such as those described in U.S. Pat. No. 4,329,369 issued to Tezuka et al. In general, the ingredients described herein can be incorporated into a chewing gum product of the invention by stirring into a warm gum base or coating the outer surface of a gum base, illustrative of which may include jelutone, rubber latex, vinylite resins, etc., desirably with conventional plasticizers or softeners, sugar or other sweeteners or carbohydrates such as glucose, sorbitol, and the like.

The following ingredients and formulations are provided by way of example and are not intended to limit the invention thereto. Thus, a variety of methods may be employed by the skilled artisan to formulate a chewing gum product of the invention, and amounts of ingredients other than active ingredients may be modified according to the needs of the formulator.

In general, chewing gum comprises a neutral and tasteless water-insoluble masticatory chewing gum base and one or more water-soluble non-masticatory ingredients mixed therein. As used herein, a non-masticatory ingredient is one that is not essential for providing the gum with its masticatory properties, such as a sweetener, a flavoring agent which determines flavor and taste characteristics of the gum, a body-treating ingredient such as a medicinal drug or pharmaceutical agent which is released at a gradual rate and ingested during chewing, or a breath-freshening ingredient which treats or reduces oral malodor.

The water-soluble portions of the chewing gum dissipate over a period of time, and the gum base portion is retained during mastication. A conventional chewing gum base suitable for use in the present invention can contain an elastomer, an elastomer solvent, and various other ingredients such as fillers, softeners, plasticizers and emulsifiers. Chewing gum base elastomers for stick gum and dragees include chicle, jelutong, balata, crown gum, guttapercha, sorva, butadiene-styrene copolymer, polyisobutylene, isobutylene-isoprene copolymer, polyethylene, and the like, or mixtures thereof. Chewing gum base elastomer solvents include pentaerythritol ester of wood rosin, glycerol ester of polymerized rosin, partially hydrogenated methyl ester of rosin, and the like. Chewing gum base waxes may include natural wax, polyethylene wax, paraffin wax, beeswax, microcrystalline wax, and the like. Gum base raw materials and methods for making gum base are well-known in the art and are described in U.S. Pat. Nos. 2,366,589 issued to Borglin, 3,821,417 issued to Westall et al., 3,984,574 issued to Comollo, 4,041,179 issued to Stubits et al., 4,170,633 issued to Wagenknecht et al., 4,400,372 issued to Muhler et al., 4,590,075 issued to Wei et al., and 5,378,131 issued to Greenberg.

A chewing gum of the invention may further include one or more antiplaque or anticalculus agents, which can reduce or prevent the formation of plaque deposits and/or calculus on teeth. There are many known antiplaque and anticalculus compositions in the art, which may be incorporated into a chewing gum product of the invention. These may include, for example, encapsulated or nonencapsulated alkali metal bicarbonate as described in U.S. Pat. No. 5,629,035 issued to Miskewitz et al., or various polyphosphate compounds as described in U.S. Pat. Nos. 4,627,977 and 5,037,637 issued to Gaffar et al., 4,515,772 issued to Parran et al., and 4,323,551 issue to Parran. Antiplaque and anticalculus compositions may be present in the chewing gum product in an amount from about 1–30 weight percent, however those skilled in the art may modify these amounts without departing from the spirit of the invention to further promote dental health and hygiene.

A chewing gum product of the invention may also include a fluoridating ingredient for the prevention of dental caries, which is typically present in an amount sufficient to release up to about 500 ppm, preferably about 25 to 300 ppm by weight of fluoride ion. Generally about 0.005 to about 3.0 weight % of such compound is present. Fluoridating agents include, for example, alkali metal fluoride, ammonium fluoride, stannous fluoride, stannous chlorofluoride, potassium stannous fluoride, alkali metal monofluorophosphate, ammonium monofluorophosphate, and the like.

A chewing gum product of the invention may also include an abrasive ingredient in an amount from about 1 to 20 weight percent of the chewing gum to provide a dentifrice cleaning action, in addition to other antiplaque or anticalculus agents. Suitable abrasives include a powder form of phosphate and silica compounds such as calcium phosphate, silica xerogel, and the like. Other types of suitable abrasives are described in U.S. Pat. Nos. 4,170,633 issued to Wagenknecht et al. and 4,891,211 issued to Winston, incorporated herein by reference.

A chewing gum product of the invention may also contain from about 0.01 to 3 weight percent of an antioxidant ingredient such as butylated hydroxytoluene, butylated hydroxyanisole, propyl gallate, and the like, which are generally known in the art.

A chewing gum of the invention may further comprise water-soluble and usually sweet non-masticatory bulking agents, a coloring agent, or a plasticizing agent which is employed to improve the texture of the gum. The water-soluble bulking ingredient in a chewing gum product typically includes bulk sweeteners, high-potency sweeteners, flavorants, softeners, emulsifiers, colorants, fillers, antioxidants, and other constituents which contribute desirable attributes. The term "water-soluble" as employed herein refers to a chewing gum ingredient which has a solubility of at least about five grams per one hundred grams of water at 25° C.

The bulking ingredient can comprise between about 5–70 weight percent of a bulking sweetener. Bulking sweeteners can consist of sugar and/or sugarless constituents. Sugar sweeteners include saccharides such as sucrose, glucose, maltose, dextrin, dried invert sugar, fructose, levulose, galactose, corn syrup solids, and the like. Sugarless sweeteners include polyhydric alcohols such as sorbitol, mannitol, xylitol, hydrogenated starch hydrolysates, maltitol, and the like. From about 0.025–2 weight percent of a high intensity sweetener ingredient can be utilized alone or in combination with a bulk sweetener. High intensity sweeteners include aspartame, saccharin, cyclamate, thaumatin, dihydrochalcones, acesulfame K compounds, and the like. Long lasting sweeteners can be achieved by encapsulating a portion or all of a high intensity sweetener ingredient. A higher content of high intensity sweetener can be employed when it is encapsulated. Encapsulants and coating techniques can be used which are similar to those described herein for an encapsulated alkali metal bicarbonate ingredient.

The chewing gum product of the invention may also contain between about 0.5–10 weight percent of a flavorant ingredient, which may or may not be encapsulated, according to know methods in the art. A flavorant ingredient shall include any flavoring or sweetening material used conventionally in the art. Examples of suitable flavorants include flavoring oils, e.g., oils of spearmint, peppermint, wintergreen, sassafras, clove, sage, anise, eucalyptus, marjoram, cinnamon, lemon, and orange, and methyl salicylate, and the like. Chewing gum flavorants are further described in U.S. Pat. Nos. 3,826,847 issued to Ogawa et al., 5,128,155 issued to Song et al., and 5,266,335 issued to Cherukuri et al., incorporated herein by reference. Examples of suitable sweetening agents include sucrose, lactose, maltose, sorbitol, xylitol, sodium cyclamate, perillartine, aspartyl phenyl alanine methyl ester, and saccharine. Suitably, flavor and sweetening agents may together comprise from about 0.1% to 5% or more of the preparation, and may be included in the chewing gum product of the invention using conventional methods known in the art. It is noted that although inclusion of sugar-based sweeteners, i.e., fermentable carbohydrates, into a chewing gum would preclude it as a dentifrice, such incorporation will not decrease the effectiveness of the microbicidal properties of the invention. Methods for incorporating these ingredients into a chewing gum product of the invention are known in the art.

Between about 0.1–15 weight percent of a softener ingredient can be added, according to methods known in the art, to enhance the ability to chew the gum product and to improve the feel of the chewing gum in the mouth. The softener ingredient may comprise glycerin or lecithin or a mixture thereof, which additionally functions as a humectant.

The chewing gum product of the present invention may also contain from about 0.001–0.2 weight percent of a colorant ingredient, such as FD&C-type dyes and lakes. The colorant can be in the form of particles which give the gum matrix a speckled appearance. The speckled effect also can be incorporated in a surface coating, such as the coating on dragee gum products. Speckled gum products are described in U.S. Pat. No. 4,744,991 issued to Serpelloni, incorporated herein by reference.

Compatibility of the ingredients in a chewing gum product, and the enhancement of flavor, can be accomplished by the inclusion of between about 0.001–3 weight percent of a surfactant ingredient in the chewing gum product. Suitable anionic surfactants include alkali metal and ammonium $C_8C_{30}$ aliphatic-containing carboxylate, sulfonate, sulfate and phosphate salts, such as sodium dioctyl sulfosuccinate, sodium lauryl sulfate, sodium dodecylbenzenesulfonate, ammonium lignosulfonate, and the like. Suitable nonionic surfactants include condensation products of alkylene oxide with fatty alcohols, amines and alkylphenols, such as ethoxylated sorbitan monostearate, ethoxylated glycerol monostearate, and the like. Suitable cationic surfactants include cetyltrimethylammonium bromide, cetylpyridinium chloride, benzyldimethylstearylammonium chloride, and the like. The cationic surfactant imparts additional antibacterial activity to a chewing gum product of the invention, but is not necessary to achieve the antimicrobial properties of the metals disclosed herein. Other surfactants which are suitable for inclusion in a chewing gum product are described in U.S. Pat. No. 3,930,026 issued to Clark, incorporated herein by reference.

In one embodiment, the chewing gum of the invention has the following composition:

a) from about 15 to 80 weight percent of a gum base;
b) from about 0.05 to 50 weight percent of dispersed antimicrobial ceramic particles having ion-exchanged silver therein in an amount from about 0.1 to 25 weight precent of the ceramic;
c) from about 0.1 to 25 weight percent of a flavorant ingredient
d) from about 0 to 25 weight percent of alkali metal bicarbonate powder ingredient;
e) from about 5 to 70 weight percent of a water-soluble bulking ingredient;
f) from about 0 to 0.2 weight percent of a colorant ingredient;
g) from about 0 to 20 weight percent of an abrasive ingredient;
h) from about 0 to 3 weight percent of a surfactant ingredient;
i) from about 0 to 3 weight percent of a fluoridating ingredient; and j) from about 1 to 15 weight percent of glycerin or lecithin, or a mixture thereof.

A chewing gum product of the present invention provides novel antimicrobial properties that may be combined with other characteristics of dentrifices to provide a more convenient adjunct to other oral hygiene vehicles such as toothpastes and mouthwashes. Thus, the invention provides a means for killing or reducing microbes residing in the mouth. More preferably the invention provides a means for killing or reducing oral bacteria. Such bacteria may include, but are not necessarily limited to those described supra.

The present invention also provides methods of promoting oral hygiene comprising masticating a chewing gum product of the invention such that the chewing gum makes contact with the teeth and other oral tissue. A chewing gum product of the present invention provides dental cleaning action, and counteracts bacteria-generated acids, enhances saliva flow, and exhibits plaque-inhibiting and tartar-control activities. The invention may be employed by anyone desiring to kill or reduce oral bacteria in the mouth, and consequently to reduce or prevent plaque and calculus formation and accumulation. Accordingly, a user can achieve these results if the chewing gum of the invention is chewed after eating foods, preferably within a few minutes after eating foods, and more preferably after eating fermentable carbohydrates. It is noted that a person may chew a chewing gum product of the invention when it is convenient or desirable, and still benefit from the antimicrobial properties of the invention. In addition, if an individual suffers from gingivitis, the chewing gum may be employed to assist in reducing oral microbes associated therewith.

To reduce oral microbes, a person inserts the chewing gum product of the invention into the mouth and chews. As the chewing gum product is chewed, the active ingredients contained in the gum make contact with the tissues of the oral cavity, thereby killing microbes on the tissues. In addition, active ingredient is released from the gum, as described hereinabove, mixes with saliva and is dispersed throughout the oral cavity, thereby further providing antimicrobial activity.

During mastication of a chewing gum product of the invention, the product provides both immediate and long lasting oral hygiene benefits. There is a clean taste and breath refreshment, and a prolonged deodorizing effect on mouth odor.

What is claimed is:

1. An antimicrobial chewing gum comprising:
   (a) a chewing gum base and
   (b) antimicrobial inorganic ceramic particles comprising ion-exchanged antimicrobial metal cations
   wherein the antimicrobial inorganic ceramic particles are present in an amount of from about 0.05 to 50 weight percent, based on the weight of the chewing gum composition, and are capable of releasing the antimicrobial metal cations in an antimicrobially effective amount.

2. A chewing gum of claim 1 wherein the antimicrobial metal ions are present in an amount from about 0.1 to 15 weight percent of the ceramic particles.

3. A chewing gum of claim 1 wherein the antimicrobial metal ions are selected from silver, copper and zinc.

4. A chewing gum of claim 1 wherein the gum achieves antimicrobial action during chewing.

5. The chewing gum according to claim 1 wherein said inorganic ceramic particles are dispersed in said chewing gum and are present in the amount of from 0.05 to 50 weight percent and an average particle size of from at 0.2 to 40 $\mu$m.

6. The antimicrobial chewing gum of claim 1 wherein the antimicrobial ceramic particles are selected from the group consisting of zeolites, hydroxy apatite and zirconium phosphates.

7. The antimicrobial chewing gum of claim 1 wherein the antimicrobial metal cations are silver cations.

8. The antimicrobial chewing gum of claim 1 wherein the release rate of the antimicrobial metal cations is about 2,500 parts per million per minute while being chewed.

9. An antimicrobial chewing gum comprising:
   (a) a chewing gum base and
   (b) antimicrobial zeolite particles comprising ion-exchanged antimicrobial metal cations
   wherein the antimicrobial zeolite particles are present in an amount of from about 0.05 to 50 weight percent, based on the weight of the chewing gum composition, and are capable of releasing the antimicrobial metal cations in an antimicrobially effective amount.

10. A chewing gum of claim 9 wherein the ion-exchanged zeolite is present in an amount of from about 0.1 to 25 weight percent.

11. The antimicrobial chewing gum of claim 9 wherein the antimicrobial metal ions are selected from the group consisting of gold, silver, copper and zinc ions.

12. The antimicrobial chewing gum of claim 9 wherein the antimicrobial metal cations are silver cations.

13. The antimicrobial chewing gum of claim 9 wherein the release rate of the antimicrobial metal cations is about 2,500 parts per million per minute while being chewed.

14. A method for killing, reducing, or inhibiting growth of oral microbes comprising the step of masticating a chewing gum according to claim 1.

15. A method for killing, reducing, or inhibiting growth of oral microbes comprising the step of masticating a chewing gum according to claim 1, wherein the inorganic ceramic particles are zeolite particles.

16. A method for killing, reducing, or inhibiting growth of oral microbes comprising the step of masticating a chewing gum according to claim 1, wherein the metal ions are selected from silver, copper, and zinc.

17. A method for killing, reducing, or inhibiting growth of oral microbes comprising the step of masticating a chewing gum of claim 1, wherein the release rate of antimicrobial metal ions is about 2,500 parts per million per minute.

18. A method for killing, reducing or inhibiting growth of oral microbes comprising the step of masticating an antimicrobial chewing gum comprising:
   (a) a chewing gum base and
   (b) antimicrobial inorganic ceramic particles comprising ion-exchanged antimicrobial metal cations
   wherein the antimicrobial zeolite particles are present in an amount of from about 0.05 to 50 weight percent, based on the weight of the chewing gum composition, and are capable of releasing the antimicrobial metal cations in an antimicrobially effective amount for a sufficient period of time to allow for the release of an antimicrobially effective amount of the antimicrobial metal cations.

19. The method of claim 18 wherein the inorganic ceramic particles are zeolite particles ion exchanged with antimicrobial metal ions selected from the group consisting of silver, copper and zinc cations.

20. The method of claim 18 wherein the inorganic ceramic particles are ion-exchanged silver zeolite particles.

21. The method of claim 18 wherein the method results in the reduction of dental caries on teeth, a reduction in the incidence of gingivitis or the reduction in the formation of plaque on teeth.

* * * * *